United States Patent [19]

Mathews

[11] Patent Number: 4,965,782
[45] Date of Patent: Oct. 23, 1990

[54] OFF-TRACK BIT SHIFT COMPENSATION APPARATUS

[75] Inventor: Harlan P. Mathews, Boulder, Calif.

[73] Assignee: Storage Technology Partners II, Louisville, Colo.

[21] Appl. No.: 199,242

[22] Filed: May 26, 1988

[51] Int. Cl.$^5$ .............................................. G11B 7/00
[52] U.S. Cl. ................................. 369/48.000; 369/53; 369/44.250; 369/44.35; 307/358
[58] Field of Search ....................... 369/48, 49, 50, 54, 369/59; 360/33, 59, 67; 307/358, 491, 494

[56] References Cited

U.S. PATENT DOCUMENTS

| | | | |
|---|---|---|---|
| 4,271,522 | 6/1981 | Droux et al. | 360/53 X |
| 4,298,898 | 11/1981 | Cardot | 360/39 |
| 4,466,089 | 8/1984 | Wachi | 369/48 X |
| 4,566,091 | 1/1986 | Gerard et al. | 369/48 X |
| 4,672,596 | 6/1987 | Romeas et al. | 369/48 X |
| 4,685,098 | 8/1987 | Yoshida | 369/48 X |
| 4,734,900 | 3/1988 | Davie | 369/59 |

*Primary Examiner*—Aristotelis M. Psitos
*Attorney, Agent, or Firm*—Dorr, Carson, Sloan & Peterson

[57] ABSTRACT

Many of the data read errors encountered in an optical disk system are due to reading off track. These errors are the result of bit shift, which is the shifting of the data transition relative to the center of the detection timing window. This bit shift is the result of the rounded edges of the data marks on the recording medium. A normal data signal is read off the recording medium while the read apparatus is centeed on the data storage track of the recording medium. If the read beam of the read apparatus moves off track radially to either side of the center of the data storage track, the detected data transitions move toward each other due to the rounded edges of the recorded data on the data storage track. This makes the data mark appear shorter and results in bit shift and increased error rate. The off-track bit shift compensation apparatus compensates for this misalignment and the resultant bit shift by dynamically adjusting the analog detection threshold of the read apparatus. The modification of the detection threshold makes the data bit written on the data storage track appear longer. Thus, if the detection threshold is lowered slightly, the detected data transitions will be shifted back to the zero position associated with the read apparatus being centered on the data storage track of the optical disk. This allows the use of both edges of the recorded mark to contain information, thereby doubling the capacity over systems which use the entire mark as a data transition.

16 Claims, 3 Drawing Sheets

1

OFF-TRACK BIT SHIFT COMPENSATION APPARATUS

FIELD OF THE INVENTION

This invention relates to optical disk data storage systems and, in particular, to apparatus to compensate for tracking errors in reading data from the optical disk.

PROBLEM

It is a problem in optical disk systems to accurately track data from one data storage track to the next and to also compensate for any misalignment therebetween. Existing off-track compensation circuits make use of complex mechanical apparatus to compensate for any tracking errors in the reading of data from the data storage tracks of the optical disk.

Optical disks can be reuseable magneto-optic recording media that are fabricated from materials that exhibit perpendicular anisotropy. When a portion of the recording medium is heated to a sufficiently high temperature in the presence of a magnetic field that is perpendicular to the recording surface of the recording medium, the heated area is magnetically oriented in the direction of the lines of force of the magnetic field. The magnetic field is produced by a magnetic transducer and the heat is produced by a laser beam focused on a spot on the recording surface of the magneto-optic recording medium.

Another form of an optical disk recording medium is the amorphous to crystalline phase-change (AXPC) materials. These AXPC materials are typically used to form a write once, read many times (WORM) media for data storage and retrieval purposes. One example of an AXPC material is tellurium suboxide (TeOx) containing additives of Ge and Sn to a level of several atomic percent. Such tellurium-based alloys exist at room temperature in either the crystalline or the amorphous form, and can be switched between each morphological state. The optical properties of such a film (e.g. reflectivity) are different for the crystalline and amorphous states. The AXPC disk is initialized with the active layer in a fine grained polycrystalline state. The data is recorded by using very brief intense laser pulses, which elevate micron-sized regions of the film just above its melting point, whereupon the crystalline atomic order is lost. Upon cooling, the melted mark area is effectively quenched into the amorphous state. Thus, the laser beam changes the reflectivity of a spot on the optical disk, which spot can be detected by a low power read laser and its associated detector and optics.

In the read data operation, the data storage tracks of the optical disk recording medium contain previously recorded material. The output power of the read laser is sufficiently low so as not to disturb the information recorded on the data storage tracks of the recording medium. The read laser beam is applied to a spot on a data storage track on the recording surface of the recording medium to read the data contained therein. The read laser beam is changed by the presence of the data spot on the recording medium. This read laser beam is reflected off the surface of the recording medium and then applied to a detector which converts the received light energy to an electrical signal indicative of the data contained on the data storage tracks of the recording medium. The leading and trailing edges of the data spot can be both used to encode data transistors, doubling the capacity over systems which use the entire written mark as a data transition. Therefore the position of the leading and trailing edges of the data spot are critical for high density recording.

The recording medium is a rotating disk of optical material. The data written on the data storage tracks of the recording medium is in the shape of an oval since the round spot applied to the recording surface of the recording medium by the write laser beam is elongated by the rotational movement of the recording medium. Therefore, the data written on the data storage tracks of the recording medium has rounded leading and trailing edges. Any misalignment of the read apparatus produces a timewise delayed leading edge for the data signal and a timewise advanced trailing edge of the data signal since the read beam of the read apparatus detects the data stored on the data storage track in an off center manner, intersecting the stored data on the curved portion rather than the leading point of the written data. Therefore, any misalignment of the read apparatus will cause a timewise displaced data signal as read from the data storage tracks. If the tracking becomes significantly misaligned, the timing of the data read from the data storage tracks contains a significant error.

SOLUTION

The above-described problem is solved and a technical advance achieved in the field by the off-track bit-shift compensation apparatus that dynamically electronically compensates for misalignment of the data read apparatus in an optical disk system. Many of the data read errors encountered in an optical disk system are due to reading off track. These errors are the result of bit shift, which is the shifting of the data transition relative to the center of the detection timing window. This bit shift is the result of the rounded edges of the data marks on the recording media. A normal data signal is read off the recording medium while the read apparatus is centered on the data storage track of the recording medium. If the read beam of the read apparatus moves off track radially to either side of the center of the data storage track, the detected data transitions move toward each other due to the rounded edges of the recorded data on the data storage track. This makes the data mark appear shorter and results in bit shift and increased error rate.

The off-track bit shift compensation apparatus compensates for this misalignment and the resultant bit shift by dynamically adjusting the analog detection threshold of the read apparatus. The modification of the detection threshold makes the data bit written on the data storage track appear longer. Thus, if the detection threshold is lowered slightly, the detected data transitions are shifted back to the zero position associated with the read apparatus being centered on the data storage track of the optical disk.

For a given optical disk system, the off-track bit shift can be determined based on the amount of curvature of the data signal as written on the data storage track of the optical disk. In addition, if the analog rise time of the read apparatus is also known, a compensation signal can be generated to reduce the analog detection threshold as a function of the amount of bit shift detected due to the misalignment of the read apparatus on the data storage track. Thus, the off-track bit shift compensation apparatus comprises compensation circuitry that adjusts the analog detection threshold of the standard read apparatus as a function of the detected tracking error and the off-track bit shift for this particular optical disk system as well as the analog rise time of the read apparatus. This circuitry dynamically adjusts for any tracking errors due to read apparatus misalignment in the optical disk system. This and other features and advantages of the present invention are disclosed herein.

DETAILED DESCRIPTION

Figure 1:
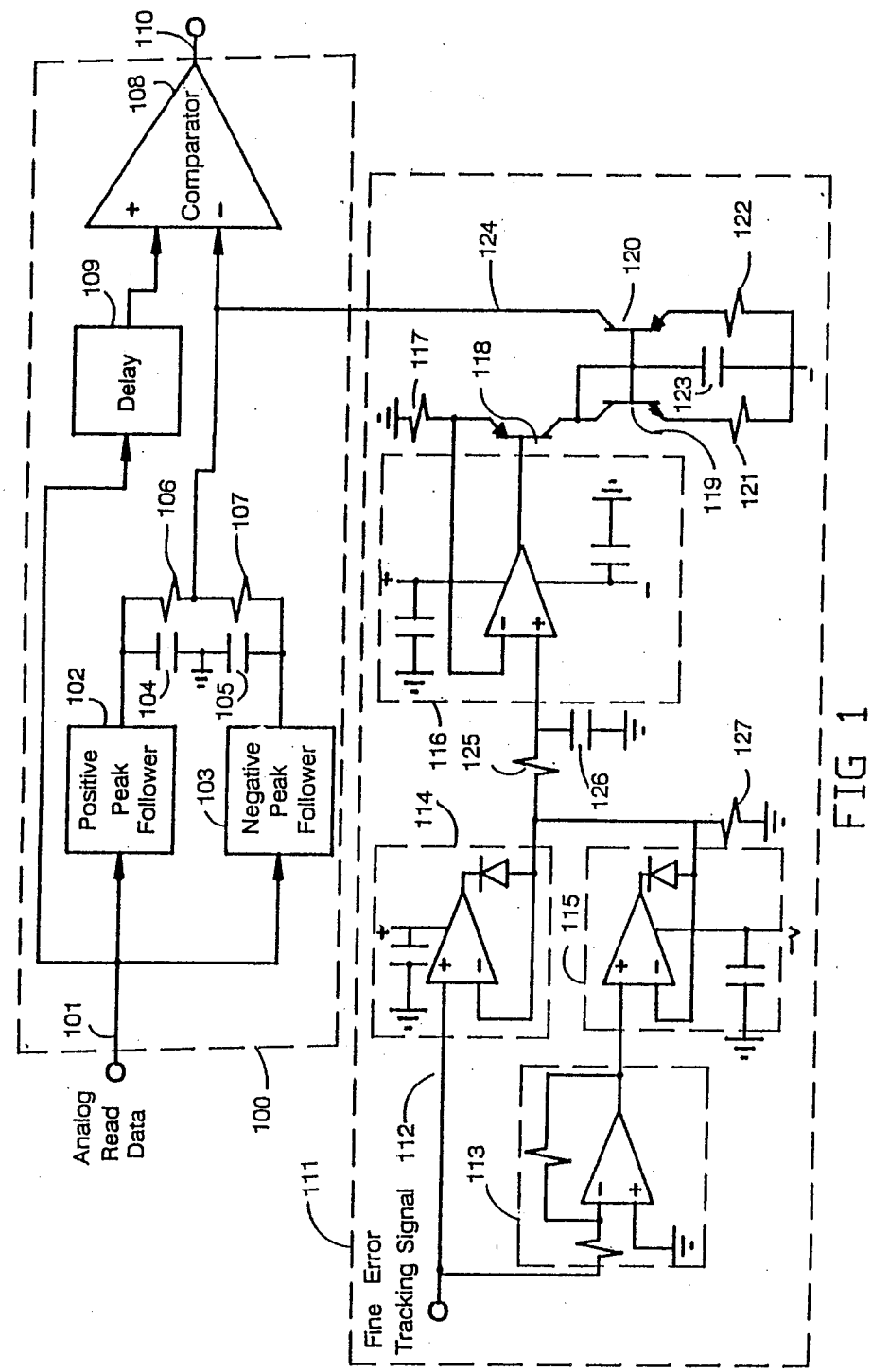
FIG. 1 illustrates the off-track bit shift compensation apparatus.

FIG. 1 illustrates the details of the off-track bit shift compensation apparatus. This apparatus consists of the circuitry enclosed in the dotted-line box labeled 111. Included in FIG. 1 is the standard analog signal data threshold detection apparatus 100 which is included in the read apparatus of the optical disk system. A transducer in the read head converts the read laser beam reflected off the optical disk data storage track into an analog electrical data signal that is applied over lead 101 to data threshold detection apparatus 100.

This data threshold detection apparatus 100 consists of an edge detector circuit that recognizes a transition in the optical properties of the recording medium as translated into an analog electrical data signal by the transducer and applied over lead 101. The analog data signal input to data threshold detection apparatus 100 is applied to three elements: a positive peak follower 102, a negative peak follower 103, and delay circuit 109. Positive peak follower 102 with its associated resistor 106 and capacitor 104 functions to detect a positive slope analog waveform on lead 101. In similar fashion, negative peak follower 103 with its associated resistor 107 and capacitor 105 functions to detect a negative slope analog waveform on lead 101. Thus, an analog data signal input on lead 101 is applied via delay circuit 109 to the positive input of comparator 108 while the same signal is detected by either positive peak follower 102 or negative peak follower 103 depending on whether the input analog da&:a signal has a rising or falling slope, respectively. Comparator 108 compares the delayed input analog data signal with the output of the peak followers 102 and 103 to determine when a valid transition occurs in the data as read from the data storage track of the optical disk and applied to lead 101. When the magnitude of the analog data signal read from the data storage track of the optical disk exceeds a predetermined threshold, comparator 108 outputs a corresponding positive or negative detected data signal on lead 110, which detected data signal is indicative of the data written on the data storage track of the optical disk.

The data threshold detection apparatus 100 described above is standard circuitry that is found in the read heads of optical disk systems. This circuitry responds solely to the change in optical properties of the data storage track of the optical disk, as converted to an analog electrical waveform by the transducer. Any tracking misalignment of the read apparatus on the data storage track of the optical disk translates into a timewise displaced signal as will be explained below.

Data Waveform and Timing Diagram for Bit Shifted Data

Figure 2:
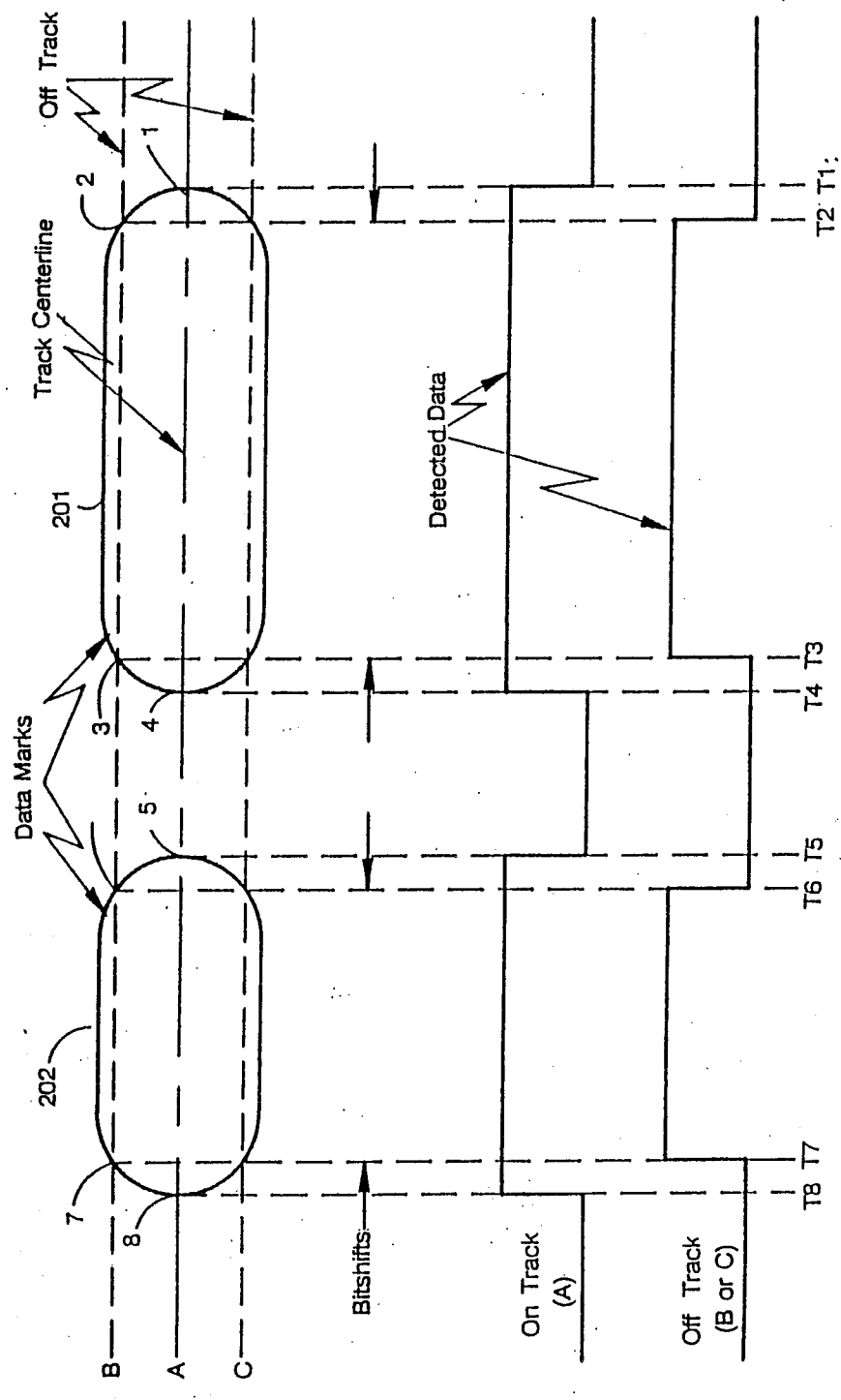
FIG. 2 illustrates a timing diagram and signal waveforms to illustrate bit shift due to a radially off-track read apparatus.

FIG. 2 illustrates a timing and waveform diagram that discloses the shape of the data signal written on the data storage track of the optical disk and how misalignment of the read apparatus translates into a timewise displacement of the data signal read from the data storage track of the optical disk.

The first diagram on FIG. 2 illustrates the shape of two data bits written on the data storage track of the optical disk. These data bits 201 and 202 have an oval shape due to the fact that the round spot of light produced by the laser beam is elongated on the recording surface of the optical disk by the rotational motion of the optical disk. Thus, if the optical disk were not rotating, the laser beam would produce a circular mark on the data storage track for each data bit written. However, the rotational motion of the optical disk sweeps the circular spot of the laser beam along the data storage track where it produces the characteristic shape illustrated by data bits 201 and 202 in FIG. 2. Horizontal line A on this diagram illustrates the center line of the data bit as written on the data storage track. Dotted lines B and C indicate two of the many possible radial off-track alignments of the read head.

The second and third diagrams on FIG. 2 indicate a timing diagram of the detected data that is produced by data threshold detection apparatus 100 of FIG. 1 responding to the analog data signal output by the transducer as it reads the data along track A or track B/C respectively. When the read apparatus transducer is centered on the center line of the data storage track, it follows a path denoted by the dotted line A. As can be seen from the second diagram of FIG. 2 labeled On Track (A), data threshold detection apparatus 100 produces a detected data signal at the threshold boundary where the transducer encounters the change in the optical properties of the recording medium indicated by the edges of data bits 201 and 202. Thus, when the transducer encounters data bit 201 at point 1, data threshold detection apparatus 100 senses the change in the optical properties of the recording medium as detected by the transducer and produces a detected data pulse as illustrated by the positive transition in the waveform of the second diagram once the magnitude of the change in optical properties exceeds a predetermined threshold. This change in optical properties is reflected by a change in the magnitude of electric current produced by the transducer. Thus, the electric current produced by the transducer changes from a low value to a high value over a short period of time. The transition in electrical current is detected by data threshold detection apparatus 100 once this electrical current has transitioned through a predetermined threshold level. Similarly, at point 4 on the first diagram of FIG. 2, the transducer encounters a second boundary or trailing edge of data bit 201 while following track A. This transition in optical properties from data bit 201 to the data storage track is detected by data threshold detection apparatus 100 which produces a corresponding transition in the detected data signal on lead 110 from a high value to a low value signal illustrated at time T4 in the second diagram of FIG. 2.

Data bit 202 produces a similar series of transitions over a different time interval due to the difference in length of data bit 202. The transition points from low to high are at point 5 and from high to low at point 8 on track A. Thus, the normal waveform detected by a perfectly aligned read apparatus is indicated by the second diagram of FIG. 2 where transitions occur at times T1, T4, T5 and T8 which are the normal data bit transition times for data bits 201 and 202 respectively.

Radial Misalignment of the Read Apparatus

A radial misalignment of the read apparatus such as the transducer being slightly off center and following, for example, track B or track C in the first diagram of FIG. 2 produces an off-track bit shift signal. It is evident from FIG. 2 that if the transducer follows the track indicated by dotted line B, the transducer will encounter the leading edge of data bit 201 at point 2. Thus, the transducer does not sense in the change in the optical properties of the data storage track until point 2 on the data storage track when the transducer encounters the leading edge of data bit 201. The change in optical properties is transmitted to data threshold detection apparatus 100 (as described above), which apparatus generates a corresponding change in detected data signal on lead 110 once the transducer has encountered the change in optical properties at the leading edge boundary of data bit 201. Due to the radial displacement of the tracking of the transducer, there is a corresponding timewise displacement in the detection of the leading edge of data bit 201 as illustrated by the third diagram on FIG. 2 which is labeled Off-Track (B/C). Data threshold detection apparatus 100 generates a change in the sense of the detected data signal on lead 110 at time T2 where the waveform transitions from a low signal to a high signal. Thus, the positional displacement of the transducer from track A to track B translates into a timewise displacement in the output data signal corresponding to a time displacement of time T1 minus time T2. This displacement is repeated at the trailing edge boundary of data bit 201 where the transducer encounters the change in optical properties at point 3 rather than point 4 and this positional displacement translates into a timewise displacement of time T3 minus time T4. The resultant detected data waveform is illustrated by the third diagram on FIG. 2 labeled Off-Track (B/C). The positional misalignment of the transducer results in a timewise condensed data signal. A similar corresponding effect is seen for data bit 202 where the data threshold detection apparatus 100 detects the change in optical properties of point 6 at a timewise displaced time of T6 and likewise for point 7 at time T7. The relative percentage of timewise displacement is obviously more significant for data bit 202 than 201 due to the shorter duration of data bit 202. The resulting shifting of the data transitions relative to the center of the detection timing window results in an increased read data error rate.

To compensation for this effect, the off-track bit shift compensation apparatus 111 modifies the analog data signal detection threshold of comparator 108 to compensate on a dynamic basis for any misalignment of the transducer with respect to the center line A of the data storage track of the optical disk.

Data Waveform and Timing Diagram for Bit Shift Compensation

Figure 3:
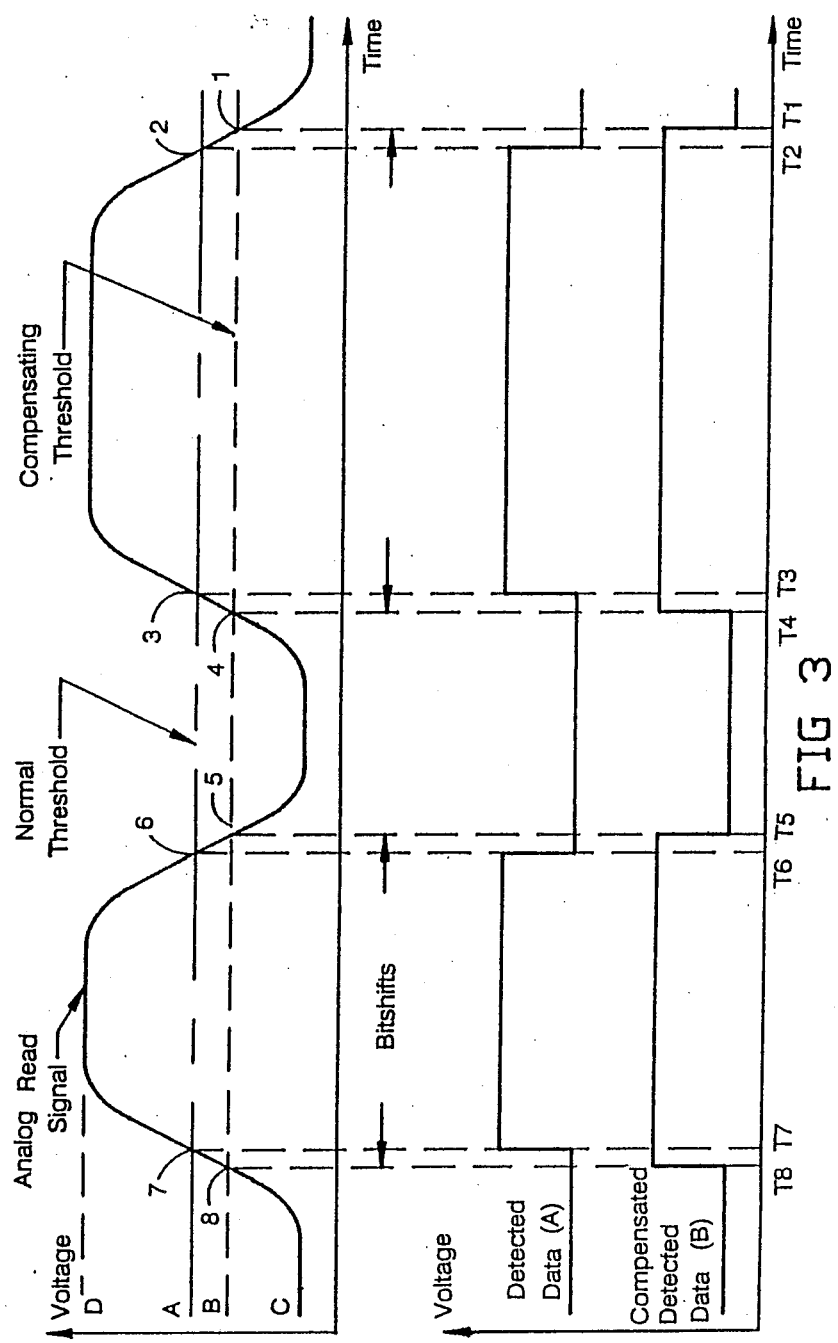
FIG. 3 illustrates the timing diagram and signal waveforms illustrative of the operation of the off-track bit shift compensation apparatus.

FIG. 3 illustrates signal waveform and timing diagrams for the off-track bit shift compensation apparatus 111 of FIG. 1. The first diagram on FIG. 3 is a waveform that is indicative of the analog data signal applied to data threshold detection apparatus 100 on lead 101. This analog data signal of FIG. 3 consists of the electrical output of the transducer in the read head of the optical disk system. Changes in the optical properties of the data storage tracks of the optical disk translate to corresponding changes in the amplitude of the analog data signal applied to lead 101. Thus, a first optical state of the data storage track of the optical disk results in an analog data signal of level indicated by the designation C, while a second optical state of the data storage track of the optical disk results in analog data signal that has a magnitude indicated by the designation D. Thus, the optical properties of the data storage track of the optical disk translate into one of two signal levels on lead 101. As the boundary of a data bit is encountered in reading the data storage track of the optical disk, the optical state of the data storage track of the optical disk changes from one level to another over a particular distance on the data storage track. This transition in optical properties causes a corresponding transition in the analog data signal on lead 101. This transition is indicated in the first diagram of FIG. 3 by the positive slope or negative slope sections of the waveform as the signal transitions between level C and level D or level D and level C respectively. In order to eliminate the possibility of errors, da&:a threshold detection apparatus 100 does not signal the completion of a change in sense of the optical properties on the data storage track of the optical disk until the analog data signal deviates from the C or D level by a predetermined amount. A predefined threshold indicated by the dotted line A in the first diagram of FIG. 3 is selected to indicate the amount of change in the analog data signal that is required before data threshold detection apparatus 100 indicates the change in the sense of the received analog data signal.

The analog data signal illustrated in FIG. 3 is the output of the transducer in the read head when the transducer follows track B of the first diagram of FIG. 2. Thus, the off-track detected data signal of the second diagram of FIG. 3 corresponds to the off-track detected data signal of the third diagram of FIG. 2. In order to correct this waveform, the off-track bit shift compensation circuit 111 must modify the operation of data threshold detection apparatus 100 to produce the compensated detected data signal that is the third diagram of FIG. 3 to exactly match the on-track detected data waveform which is the second diagram of FIG. 2. It is evident from FIG. 3, that the compensated detected data signal waveform, when translated into a corresponding set of points on the analog data signal waveform of FIG. 3 produces a new threshold level indicated by the dotted line B. Thus, if the detection threshold of data threshold detection apparatus 100 were at level B instead of level A, the detected data signal on lead 110 produced by comparator 108 would have the waveform of the compensated detected data signal rather than the off-track detected data signal. This modification of the detection threshold expands the detected data waveform from points T2, T3 on the first data bit 201 to the points T1, T4 which correspond to the on-track detected data waveform of FIG. 2. Similarly, data bit 202 instead of having transition times of T6 and T7 would have transition times of T5 and T8 which also correspond to the on-track waveform of FIG. 2. Thus, the threshold when reduced from level A to level B causes data threshold detection apparatus 100 to detect the analog data signal at point 1 rather than point 2, at point 4 rather than point 3, at point 5 rather than point 6, and at point 8 rather than point 7. These changes in the detection level produce the corresponding bit shift correction required to offset the radial misalignment of the read apparatus on the data storage track.

Off-Track Bit Shift Compensation Apparatus

The off-track bit shift compensation apparatus 111 accomplishes this correction by using a fine tracking error signal applied on lead 112 to modify the detection threshold of data threshold detection apparatus 100. The fine tracking error signal is obtained by tracking the previous data storage track on the optical disk or a synchronization data storage track or by tracking on the data track. The fine tracking error signal on lead 112 is applied to driver 114 and via invertor 113 to driver 115. Drivers 114 and 115 respond to fine tracking error signals in both the positive and negative directions respectively to produce a corresponding error drive current. The error drive current is created by driver 114 for a positive fine tracking error signal and by driver 115 for a negative fine tracking error signal. This correction current discharges capacitor 126 by way of resistor 125 thereby causing level shifter 116 to vary its drive current output to transistor 118. Drive transistor 118 drives one leg of a current mirror circuit which consists of transistors 119 and 120 and their corresponding resistors 121, 122. The drive current output on the collector of transistor 118 is applied to the collector of transistor 119 of one leg of the current mirror circuit and produces a corresponding current in the collector of transistor 120. This current is applied by lead 124 to the threshold setting resistors, 106 and 107, thereby drawing down this input of comparator 108 to correct the threshold used in data threshold detection apparatus 100. The values of the resistors and capacitors in off-track bit shift compensation circuit are selected to translate the specific parameters of this optical disk apparatus to the appropriate drive current for lead 124. In particular, resistors 106 and 107 of data threshold detection apparatus 100 are identical in value. The value of resistor 117 in off-track bit shift compensation apparatus 111 is selected so that the ratio of the value of resistor 106/107 to the value of resistor 117 reflects the values of the parameters of this particular optical disk system. Thus, the analog rise time of data threshold detection apparatus 100 as well as the timewise bit shift for a corresponding positional misalignment of the read apparatus as well as the magnitude of the fine tracking error signal on lead 112 are all used to calculate the values of resistors 106/107 and 117. By the appropriate selection of these resistors, the fine tracking error signal on lead 112 translates into a corresponding exact compensation signal on lead 124 to precisely modify the analog detection threshold of comparator 108 to produce the necessary bit shift compensation to offset the misalignment of the read apparatus on the data storage track.

While a specific embodiment of this invention has been disclosed herein, it is expected that those skilled in the art can design other embodiments that differ from this particular embodiment but fall within the scope of the appended claims.

I claim:

1. A method of tracking data written on an optical disk data storage system, which includes read apparatus having a detection threshold for concurrently reading data stored on at least two selected data storage tracks of a circular optical disk, said data storage tracks including a plurality of circular, concentrically arranged data storage tracks written on said optical disk, comprising the steps of:
   detecting data transitions on a first selected data storage track read by said read apparatus;
   comparing said detected data transitions with corresponding data transitions written on a second selected data storage track concurrently read by said read apparatus along the entire length of both said concentrically arranged first and second selected data storage tracks; and
   adjusting the data transition detection threshold of said read apparatus so that said detected data transitions on said first selected data storage track timewise correspond to said data transitions on said second selected data storage track.

2. The method of claim 1 wherein said step of comparing includes the step of:
   generating a tracking error signal indicative of the time difference between said detected data transitions of said first selected data storage track and said corresponding data transitions on said second selected data storage track.

3. The method of claim 2 wherein said step of adjusting includes the step of:
   converting said error signal into a threshold adjustment signal indicative of said time difference.

4. The method of claim 3 wherein said step of adjusting further includes the step of:
   applying said threshold adjustment signal to said read apparatus to adjust said data transition detection threshold.

5. Apparatus for tracking data on an optical disk data storage system which includes data read apparatus for concurrently reading data stored on at least two selected data storage tracks of a circular optical disk, said data storage tracks including a plurality of circular, concentrically arranged data storage tracks written on said optical disk, comprising:
   means for detecting data transitions on a first selected data storage track read by said read apparatus having a detection threshold;
   means for comparing said detected data transitions with corresponding data transitions on a second selected data storage track concurrently read by said read apparatus along the entire length of both said concentrically arranged first and second selected data storage tracks; and
   means responsive to said comparing means for adjusting the data transition detection threshold of said detecting means to obtain a timewise correspondence between said detected transitions and said corresponding transitions on said first and said second selected data storage tracks, respectively.

6. The apparatus of claim 5 wherein said comparing means includes:
   means for generating a tracking error signal indicative of the time difference between said detected data transitions of said first selected data storage track and said corresponding data transitions of said second selected data storage track.

7. The apparatus of claim 6 wherein said adjusting means includes:
   means for converting said error signal into a threshold adjustment signal indicative of said time difference.

8. The apparatus of claim 7 wherein said adjusting means further includes:

means for applying said threshold adjustment signal to said read apparatus to adjust said data transition detection threshold.

9. Apparatus for compensating for tracking misalignment between a read head and data storage tracks on a circular optical disk, said data storage tracks including a plurality of circular concentrically arranged data storage tracks written on said optical disk, and said read head concurrently reading at least two selected data storage tracks, comprising:

means for generating a signal indicative of the timewise displacement of data transitions detected on a first selected data storage track read by said read head and data transitions on a second selected data storage track along the entire length of both said concentrically arranged first and second selected data storage tracks; and data transition detection means responsive to said signal for adjusting a threshold used to detect data transitions on said first selected data storage track read by said read head to eliminate said timewise displacement.

10. The apparatus of claim 9 wherein said data transition detection means includes:

means responsive to said signal for converting said signal to a threshold adjustment signal of magnitude to offset said timewise displacement by modifying the transition detection sensitivity of said read head.

11. The apparatus of claim 10 wherein said data transition detection means further includes:

means for applying said threshold adjustment signal to said read head in synchronization with said data transitions.

12. A method of compensating for tracking misalignment between a read head and data storage tracks on a circular optical disk said data storage tracks, including a plurality of circular concentrically arranged data storage tracks written on said optical disk, and said read head concurrently reading at least two selected data storage tracks, comprising the steps of:

generating a signal indicative of the timewise displacement of data transitions detected on a first selected data storage track read by said read head and data transitions on a second selected synchronization data storage track concurrently read by said read head, along the entire length of both said concentrically arranged first and second selected data storage tracks; and adjusting, in response to said signal, a threshold used to detect data transitions on said first selected data storage track read by said read head to eliminate said timewise displacement.

13. The method of claim 12 wherein said step of adjusting includes the step of:

converting said signal to a threshold adjustment signal of magnitude to offset said timewise displacement by modifying the transition detection sensitivity of said read head.

14. The method of claim 13 wherein said step of adjusting further includes the step of:

applying said threshold adjustment signal to said read head in synchronization with said data transitions.

15. In an optical disk data storage system which includes read apparatus for concurrently reading data from at least two data storage tracks of a circular optical disk, said data storage tracks including a plurality of circular concentrically arranged data storage tracks written on said optical disk, apparatus for compensating for misalignment between said data storage tracks on said optical disk and said read apparatus of said optical disk data storage system comprising:

fine tracking means for detecting data signals written on a first selected data storage track;

means for detecting a data transition on a second of said selected data storage tracks by comparing the signal read from said second selected data storage track with a predetermined threshold indicative of the presence of a data transition on said data storage tracks;

means responsive to data transitions detected by said read apparatus for comparing said data transitions with data transitions concurrently read by said read apparatus from said first selected data storage track along the entire length of both said concentrically arranged first and second selected data storage tracks; and means responsive to said comparing means for adjusting said threshold so that said detected data transitions correspond to said data transitions on said first selected data storage track.

16. In an optical disk data storage system which includes read apparatus for concurrently reading data from at least two selected data storage tracks of a circular optical disk, said data storage tracks including a plurality of circular concentrically arranged data storage tracks written on said optical disk, apparatus for compensating for misalignment between said data storage tracks on said optical disk and said read apparatus of said optical disk data storage system comprising:

fine tracking means for detecting data signals stored on a first selected data storage track;

means for detecting a data transition on a second selected data storage track by comparing the signal read from said second selected data storage track with a predetermined threshold indicative of the presence of a data transition on said second selected data storage track;

means responsive to data transitions detected by said read apparatus for comparing said data transitions with data transitions concurrently read by said read apparatus from said first selected data storage track along the entire length of both said concentrically arranged first and second selected data storage tracks;

means responsive to said comparing means for generating a tracking signal indicative of the timewise displacement between said detected data transitions and said corresponding data transitions on said first and second selected data storage tracks, respectively;

means for converting said tracking signal into a corresponding threshold adjustment signal to offset said timewise displacement by modifying the threshold detection sensitivity of said detecting means; and means for applying said threshold adjustment signal to said detecting means.

* * * * *